(12) United States Patent
Elshaer et al.

(10) Patent No.: US 11,148,545 B2
(45) Date of Patent: Oct. 19, 2021

(54) VEHICLE GROUND FAULT DETECTION

(71) Applicant: Ford Global Technologies, LLC, Dearborn, MI (US)

(72) Inventors: Mohamed Elshaer, Canton, MI (US); Allan Roy Gale, Livonia, MI (US); Chingchi Chen, Ann Arbor, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 293 days.

(21) Appl. No.: 16/405,639

(22) Filed: May 7, 2019

(65) Prior Publication Data

US 2020/0353834 A1    Nov. 12, 2020

(51) Int. Cl.
*B60L 53/62* (2019.01)
*B60L 53/14* (2019.01)
*B60L 53/20* (2019.01)
*H02J 7/00* (2006.01)
*H02H 3/16* (2006.01)
(Continued)

(52) U.S. Cl.
CPC .............. *B60L 53/62* (2019.02); *B60L 53/14* (2019.02); *B60L 53/20* (2019.02); *H02H 1/0007* (2013.01); *H02H 3/16* (2013.01); *H02J 7/0029* (2013.01); *B60L 50/60* (2019.02); *B60L 2210/10* (2013.01); *B60L 2210/30* (2013.01)

(58) Field of Classification Search
CPC .......... B60L 53/62; B60L 53/14; B60L 53/20; B60L 2210/10; B60L 50/60; B60L 2210/30; B60L 2240/529; B60L 53/22; B60L 3/12; B60L 3/0069; B60L 58/10; B60L 3/00; H02J 7/0029; H02J 2310/48; H02J 7/0031; H02J 7/14; H02J 1/06; H02H 3/16; H02H 1/0007; H02H 3/08; H02H 3/162; Y02T 90/14; Y02T 90/12; Y02T 10/92; Y02T 10/7072; Y02T 10/72; Y02T 10/70
See application file for complete search history.

(56) References Cited

U.S. PATENT DOCUMENTS 4,870,527 A    9/1989 Zaleski
5,014,043 A    5/1991 Lopetrone et al.
(Continued)

FOREIGN PATENT DOCUMENTS

DE    3921063 C1    6/1989

OTHER PUBLICATIONS

"Exploration of the Impact of High Voltage Ground Fault in an Electric Cehicle Connected to Earthing Systems Worldwide", by Mohamed A. Elshaer, Allan Gale, and Chingchi Chen, SAE International, Mar. 28, 2017 (reference from IDS).*
(Continued)

*Primary Examiner* — Nha T Nguyen
(74) *Attorney, Agent, or Firm* — David B. Kelley; Brooks Kushman P.C.

(57) ABSTRACT

A vehicle power system includes a traction battery, a non-isolated power converter, a current sensor that measures phase current input to the non-isolated power converter during charging of the traction battery with grid power, and a controller. The controller interrupts an electrical connection between the traction battery and a source of the grid power responsive to a magnitude of a 3rd harmonic component of the phase current exceeding a threshold value to prevent further charging of the traction battery.

11 Claims, 8 Drawing Sheets

(51) Int. Cl.
*H02H 1/00* (2006.01)
*B60L 50/60* (2019.01)

(56) References Cited

U.S. PATENT DOCUMENTS

| | | |
|---|---|---|
| 8,760,826 B2 | 6/2014 | West |
| 9,568,532 B2 | 2/2017 | Parkhou et al. |
| 9,748,832 B2 | 8/2017 | Nishikawa |
| 2018/0134408 A1 | 5/2018 | Handy |
| 2019/0173272 A1* | 6/2019 | Yoon .................... G01R 31/52 |

OTHER PUBLICATIONS

Mohamed A. Elshaer et al., "Exploration of the Impact of High Voltage Ground Fault in an Electric Vehicle Connected to Earthing System World Wide," SAE International, published Mar. 28, 2017, 10 pages.

* cited by examiner

VEHICLE GROUND FAULT DETECTION

TECHNICAL FIELD

This disclosure relates to charging of vehicle batteries.

BACKGROUND

Earth faults can be caused by insulation loss between an energized conductor and a vehicle chassis. In the case of an electric vehicle, the utility ac source connects to a power processing conversion system to charge a battery. Although the battery is, in this context, a load, it also can be a source of energy while charging when encountering a ground fault situation.

Original vehicle manufacturers (OEMs) may design their vehicles to work under universal input ac voltage. In order to make use of the existing low voltage public distribution systems, vehicles may be able to charge with both the one phase and double/split phase configurations. The J1772 standard includes recommended practice for ac level 1 and ac level 2 charge levels as well as the conductive charge coupler and electrical interfaces. The J1772 and other similar standards consider the ac input as a voltage source by defining its voltage level and its connection to the vehicle.

In the vehicle, certain modules that enclose energized parts are housed in conductive cases. These cases may be conductively connected to the vehicle chassis.

SUMMARY

A vehicle power system includes a traction battery, a non-isolated power converter that transfers grid power to the traction battery, a current sensor that measures phase current input to the non-isolated power converter during charging of the traction battery with grid power, and a controller. The controller interrupts an electrical connection between the traction battery and a source of the grid power responsive to a magnitude of a 3rd harmonic component of the phase current exceeding a threshold value to prevent further charging of the traction battery. The controller may further analog filter the phase current to attenuate a fundamental frequency component of the phase current. The controller may further implement a phase lock loop to identify the fundamental frequency component of the phase current. The controller may further transform the phase current into two DC components having a reference frame synchronized with the fundamental frequency component. The controller may further digital filter the phase current to further attenuate the fundamental frequency component. The controller may further synchronize the reference frame with the 3rd harmonic component. The controller may further digital filter the two DC components to attenuate harmonic frequency components of the phase current greater than the 3rd harmonic component. A magnitude of the two DC components may define the magnitude of the 3rd harmonic component.

A vehicle power system includes a power converter and a controller. The controller, during transfer of grid power to the traction battery via the power converter, detects a ground fault condition responsive to a magnitude of a 3 harmonic component of phase current input to the power converter exceeding a threshold value, and prevents further charging of the traction battery responsive to presence of the ground fault condition. The vehicle power system may further include a single current sensor to sense the phase current. The single current sensor may be electrically between a source of the grid power and the power converter. The power converter may be a non-isolated power converter.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
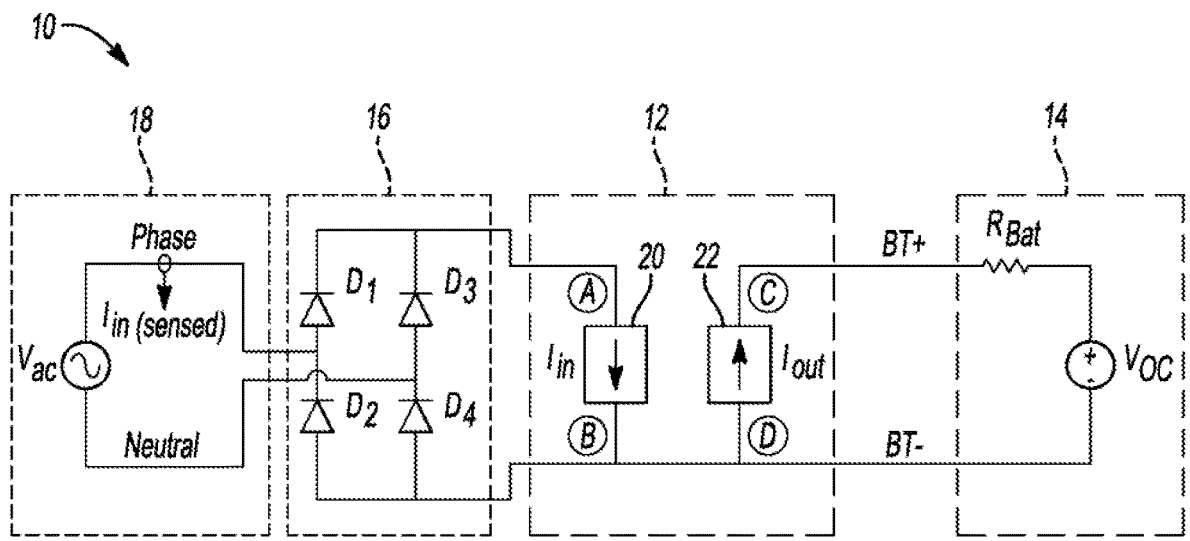
FIG. 1 is a circuitry diagram of a non-isolated charger connecting a battery pack to an ac grid via a full-bridge rectifier.

To quantify the impact of a ground fault, a model 10 for an ideal non-isolated charger 12 is created with reference to FIG. 1. The model 10 includes a battery 14, a full bridge rectifier 16, and an ac grid 18. The charger 12 is electrically between the battery 14 and rectifier 16. The rectifier is electrically between the charger 12 and ac grid 18. The charger 12 represents operation at unity input power factor. It is assumed that the charger 12 remains stable under the fault condition (i.e. the charger 12 ideally performs power conversion between its connected terminals). A generalized model is created by two dependent current sources 20, 22. The input current source 20 models the charger's ac input current while operating at unity power factor. The output current source 22 models the charger's output current while charging the battery 14 with a defined open circuit voltage.

The model does not account for losses in the charger 12. Hence, it is assumed that the output power at port CD is equal to the input power at port AB averaged over one ac-line cycle. The emulated resistance at port AB is the input ac resistance seen by the ac-grid 18 and is given by equation (1). Since it is assumed that the charger 12 operates at unity input power factor, the input current to the charger 12 is given by equation (2). The charger's output current at port CD is the d current delivered to the battery 14 and is given by equation (3).

$$R_e = \frac{V_{ac(grid)}^2(\text{RMS})}{P_{out}} \quad (1)$$

$$I_{in} = \frac{|V_{ac(grid)}|}{R_e} \quad (2)$$

$$I_{out} = \frac{P_{out}}{V_{CD}} \quad (3)$$

A generalized model for a non-isolated charger can be created by yoking port B and port D. A first order battery model is created by a voltage source representing the open circuit voltage of the battery 14 for a specific state-of-charger operation. Additionally, the internal resistance of the battery 14 is depicted by $R_{Bat}$, which is a series resistor in the path of the battery current. The voltage at port CD is the voltage developed at the dependent current source 22 due to the current flow to the battery 14. The voltage developed across $R_{Bat}$ directly corresponds to the amount of power delivered to the battery 14.

The voltage across the terminals named "phase" and "neutral," Vac, is the utility ac voltage. It is assumed that this voltage is perfectly sinusoidal and is described by equation (4). It is also assumed in this model that the input current is sensed by measuring the current flowing through the terminal named "phase." The charger 12 is controlled such that the input current is in-phase with the input voltage. Hence, the charger switches are modulated such that the measured current, $I_{in(sensed)}$, follows a reference current described by equation (5).

$$V_{ac} = |V_{ac(grid)}|\sin(\omega t) \quad (4)$$

$$I_{in(ref)} = \frac{|V_{ac(grid)}|}{R_e}\sin(\omega t) \quad (5)$$

In order to clarify the stated assumptions, the well-known PFC boost rectifier circuit is taken as an example. The output of the boost rectifier is connected to a large energy storage capacitor. This energy storage capacitor balances the power difference between the input and output ports of the charger 12. This allows the charger to output constant power while its input is alternating power. Since this capacitor does not consume any real power, the average input ac-power is equal to the output power during steady-state operation. Hence, the input and output ports of the charger 12 may be decoupled because the input port is mainly controlled to regulate the input current to be in-phase with the input voltage, and its amplitude depends on the resistance Re, given in equation (1), which is determined by the rms ac input voltage and output power.

The choice of the grounding system has a major influence on the safety and electromagnetic compatibility of power supplies. The magnitude and flow of fault currents in a system are unique to the type of the earthing system. Circulation of current through the earth does not occur in all fault conditions. Faults that energize an exposed conductive part create a potential difference between this exposed conductive part and the earth. Protective equipotential bonding and automatic disconnection in case of a fault are required for circuits connected to the utility grid.

Industrial facilities that own front-end substations may employ a TN (Tera Neutral) grounding system, even if the outside earthing system is TT (Tera Tera). In this scenario, the local utility supplies the facility with medium to high voltage tension. The substation may have a transformer to stepdown the supplied voltage to low voltage levels suitable for the consumer. Typically, the primary side is wound as delta and the secondary side is wound as a wye. The neutral of the secondary side (wye connected winding) is solidly grounded. All exposed conductive parts are connected to this neutral point via protective conductors. The protective conductor is designed to withstand the fault current. Additionally, the neutral connection is carried to supply power to single phase loads.

There are three ways to implement the TN grounding system: (i) TN-S—the neutral is carried to supply current for the single phase loads; (ii) TN-C—the neutral and protective conductor wires are combined in a single cable; and, (iii) TN-C-S—the neutral and protective conductor are combined in a single cable only in parts of the system but separated in different parts. Also, a separate protective conductor is carried to handle fault currents. Unlink the TT system, the fault current circulates through the protective conductor, and it will not circulate through the earth.

The protective multiple system, or so-called TN-C-S, is the grounding system that will be used to describe a ground fault in a vehicle connected to any type of TN network (i.e. TN-C, TN-S, TN-C-S). The point of contact between the vehicle and the supply system is through the electric vehicle supply equipment (EVSE), which is defined in SAE J1772.

Countries that use the TN-C-S system include U.S.A., Australia, U.K., Canada, China, Germany, South Africa, Sweden, and Switzerland. Single phase voltage is supplied in different voltage levels (120V, 240V) and implemented by various means: one phase power and double/split phase power. The neutral line of the supply system is solidly grounded by a rod with resistance $R_N$. The Neutral line is carried to supply power to single-phase loads. Consumer ground is connected locally via a ground electrode, independent of the utility earthling system, with resistance $R_G$.

Ground fault current in the double/split phase power implementation is different than the one phase power implementation. In order to illustrate the difference, consider that a fault is incurred between the battery positive terminal (BT+) and the vehicle chassis. Due to the fault, the resistance between BT+ and vehicle chassis is $R_{fault+}$. There are six states that describe the fault current:

State 1 (0≤*t*<*t*1)

In the positive ac line cycle, the fault current causes D1 and D4 to not conduct at the same time. Meanwhile, D1 conducts first once the electric grid voltage turns positive. Shortly after D4 conducts, after its voltage drops to zero. The charger input voltage is described by equation 6. State 1 ends once D4 conducts. The voltage across D4 is described by equation (7) and t1 is given by equation (8). The ground fault current is equal to the charger's input current because D1 is the only diode conducting and the charger is actively controlling its current to emulate the resistance Re. The ground fault current for state 1 is described by equation (9).

$$V_{in} = \frac{V_{ac}(t)}{2}\left[1 - \frac{R_{fault}}{R_e}\right] + V_{bat}, 0 \leq t < t_1 \quad (6)$$

-continued $$V_{D4} = -\frac{R_{fault}}{R_e}\frac{V_{ac}(t)}{2} + V_{bat}, 0 \le t < t_1 \quad (7)$$

$$t_1 = \frac{1}{\omega}\sin^{-1}\left(\frac{2R_e V_{bat}}{\sqrt{2V}_{ac(rms)}R_{fault}}\right) \quad (8)$$

$$I_{PE} = \frac{V_{ac}(t)}{R_e}, 0 \le t < t_1 \quad (9)$$

State 2 ($t1 \le t < t2$)

D4 starts conducting at t1. The charger's input voltage is fixed by the supplied electric utility voltage. Current flowing through D1 is sinusoidal and controlled by the charger 12 such that unity input power factor is realized. Due to the conduction of D4, the ground current is clamped at a constant value. The magnitude of the ground current depends on the battery voltage and the fault loop impedance, as shown by equation (10). Current flowing through the phase wire returns to the supply via two paths: The protective conductor and the supplied phase wire. Hence, it is expected that the current flowing through D1 is higher than the current flowing through D4. Current flowing through D4 is negatively biased by the ground current and is given by equation (11).

$$I_{PE} = \frac{V_{bat}}{R_{fault}}, t_1 \le t < t_2 \quad (10)$$

$$I_{D4} = I_{phase} - I_G, t_1 \le t < t_2 \quad (11)$$

State 3 ($t2 \le t < t3$)

Since the current flowing through D4 is negatively biased by the ground current, D4 shall reverse bias before D1. This causes the circuit to become the same as state 1 until the electric utility voltage becomes negative.

States 4 to 6

Unlike the one phase power implementation, states 4 to 6, occurring during the negative line cycle, are identical to states 1 to 3, occurring in the positive line cycle.

Single point fault, between the high voltage bus and earth ground, in non-isolated power converters, could potentially raise the voltage of exposed conductors. A typical battery charger consists of a non-isolated boost-based power factor correction (PFC) circuit and an isolated DC-DC converter. Isolation between the battery DC bus and AC grid is achieved via the transformer located in the second stage DC-DC converter. Hence, a single point fault between the battery DC bus and earth ground is not possible.

On the contrary, the HV DC bus of the first power conversion stage could be susceptible to single point faults. The energy storage capacitor is designed such that it consumes or supplies the difference between the instantaneous load power and the instantaneous input ac power. Energy stored in this capacitor is very large (>120 J) and could be a source for fault current. Furthermore, the fault current can exceed 300 mA for more than 10 s, for faults occurring at the intermediate HV DC bus. Proposed herein are techniques for detecting the fault current by using the existing current sensor that is used to regulate the input current to the PFC circuit.

Detection of ground fault current is achieved by sensing the input phase current third harmonic component. Phase current is measured by a single current sensor located between the AC grid and front-end rectifier. This current sensor is used to provide feedback to the current controller thus enabling the PFC circuit to regulate the input current to be sinusoidal and in phase with the input AC voltage. Under a fault condition, an additional DC component will start to flow through the current sensor thus causing a mismatch in the conduction timing between the two diagonal diodes in the front-end rectifier. Due to this mismatch in diode conduction timing, the phase current third harmonic component will increase due to the flow of common mode current. Hence, a ground fault current can be correlated to the phase current third harmonic component.

Figure 2:
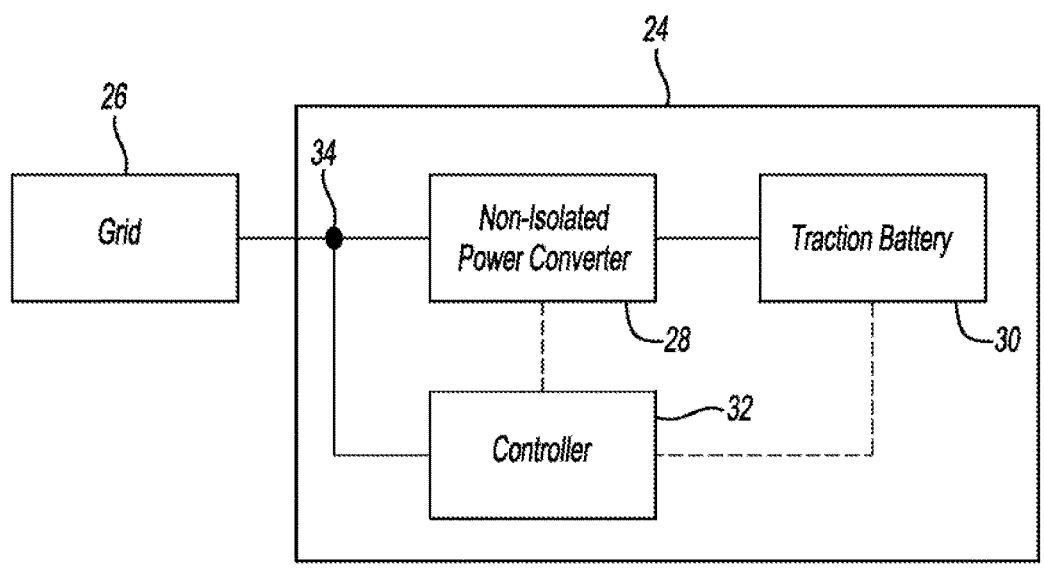
FIG. 2 is a block diagram of a vehicle connected with an ac grid.

FIG. 2 is a block diagram of a vehicle 24 connected with an ac grid 26. The vehicle 24 includes, among other things, a non-isolated power converter 28, a traction battery 30, and one or more controllers 32. The power converter 28, when the vehicle 24 is connected with the ac grid 26, is electrically between the ac grid 26 and battery 30. A single current sensor 34 monitors the electrical connection between the ac grid 26 and battery 30. The controllers 32 are in communication with/control the power converter 28, battery 30, and current sensor 34. During charge of the battery 30, power from the ac grid 26 flows through the power converter 28. The single current sensor 34 can be used to detect ground fault currents.

Figure 3:
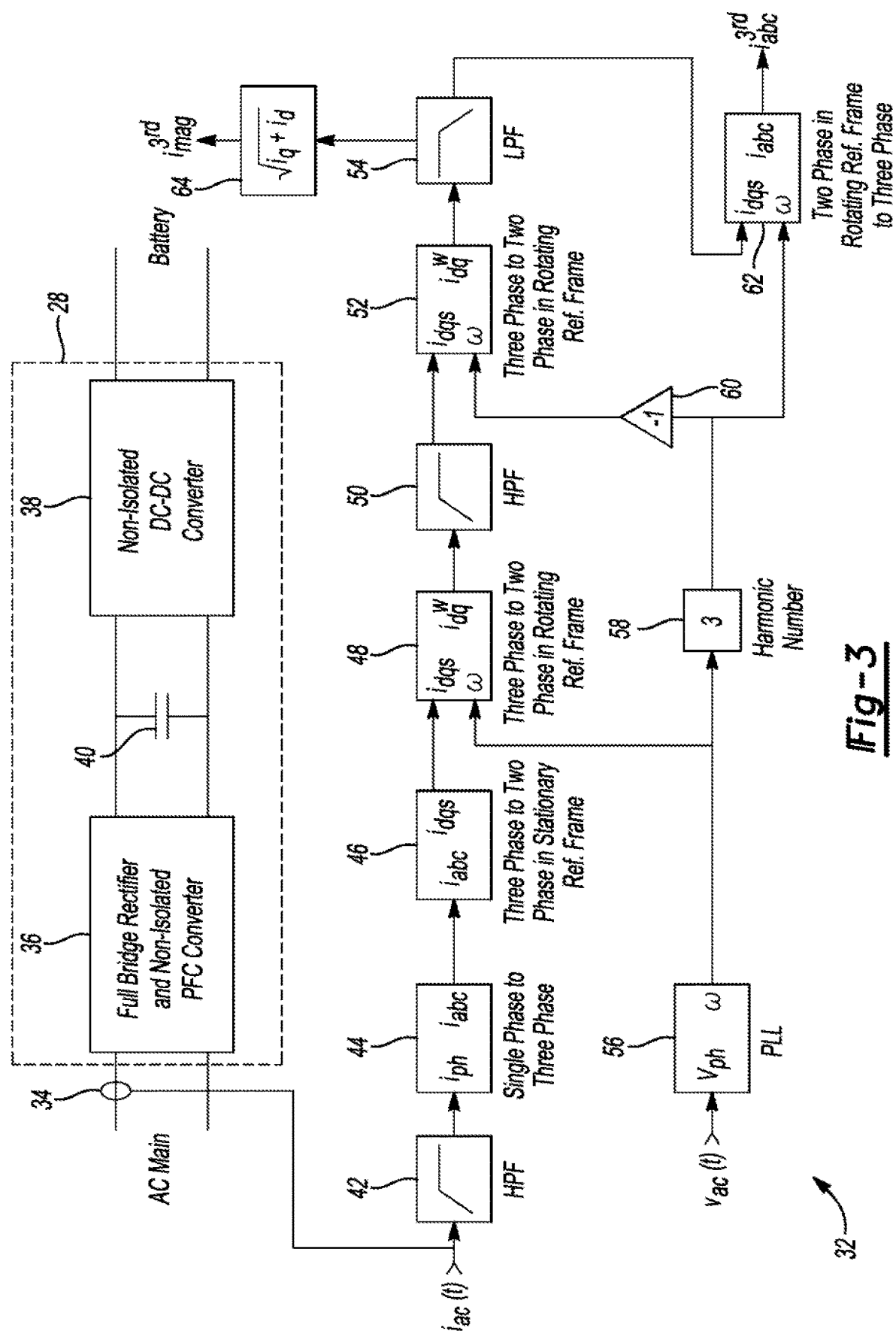
FIG. 3 is a block diagram of portions the non-isolated power converter and controller of FIG. 2.

FIG. 3 is a block diagram of the power converter 28 and controllers 32 of FIG. 2. The power converter 28 includes a full bridge rectifier and non-isolated PFC converter 36, a non-isolated DC-DC converter 38, and an energy storage capacitor 40. The capacitor 40 is electrically between the rectifier and PFC converter 36 and DC-DC converter 38.

The controllers 32 perform various operations to calculate the magnitude of the phase current third harmonic component. These operations include an analog high pass filter operation 42, a single phase to three phase operation 44, a three phase to two phase in stationary reference frame operation 46, a three phase to two phase in rotating reference frame operation 48, a digital high pass filter operation 50, a three phase to two phase in rotating reference frame operation 52, a digital low pass filter operation 54, a phase lock loop (PLL) operation 56, a harmonic number designator operation 58, an inverse operation 60, a two phase in rotating reference frame to three phase operation 62, and a magnitude calculation phase 64. The following discussion alludes to the operations of FIG. 3 just described.

Figure 4A:
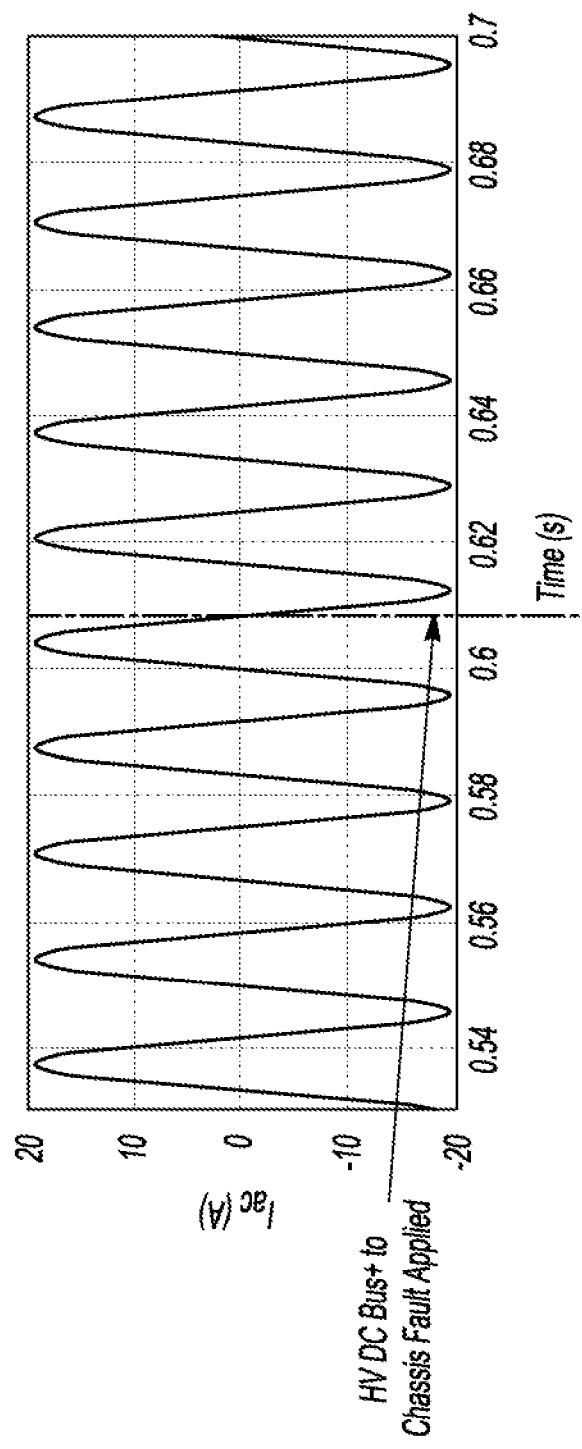
FIGS. 4A and 4B are plots of unfiltered and filtered input phase current magnitude vs. time, respectively.
Figure 4B:
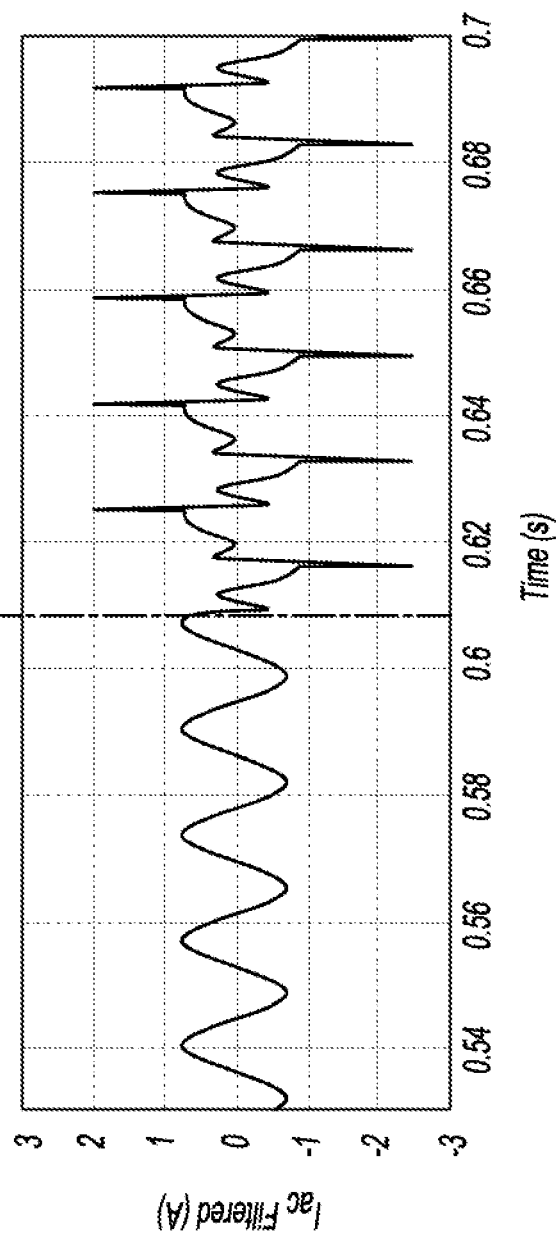

A high pass filter is used to attenuate the 60 Hz component of the input phase current. FIGS. 4A and 4B show the input phase current before and after the high pass filter. (Reference the operation 42.)

Figure 5A:
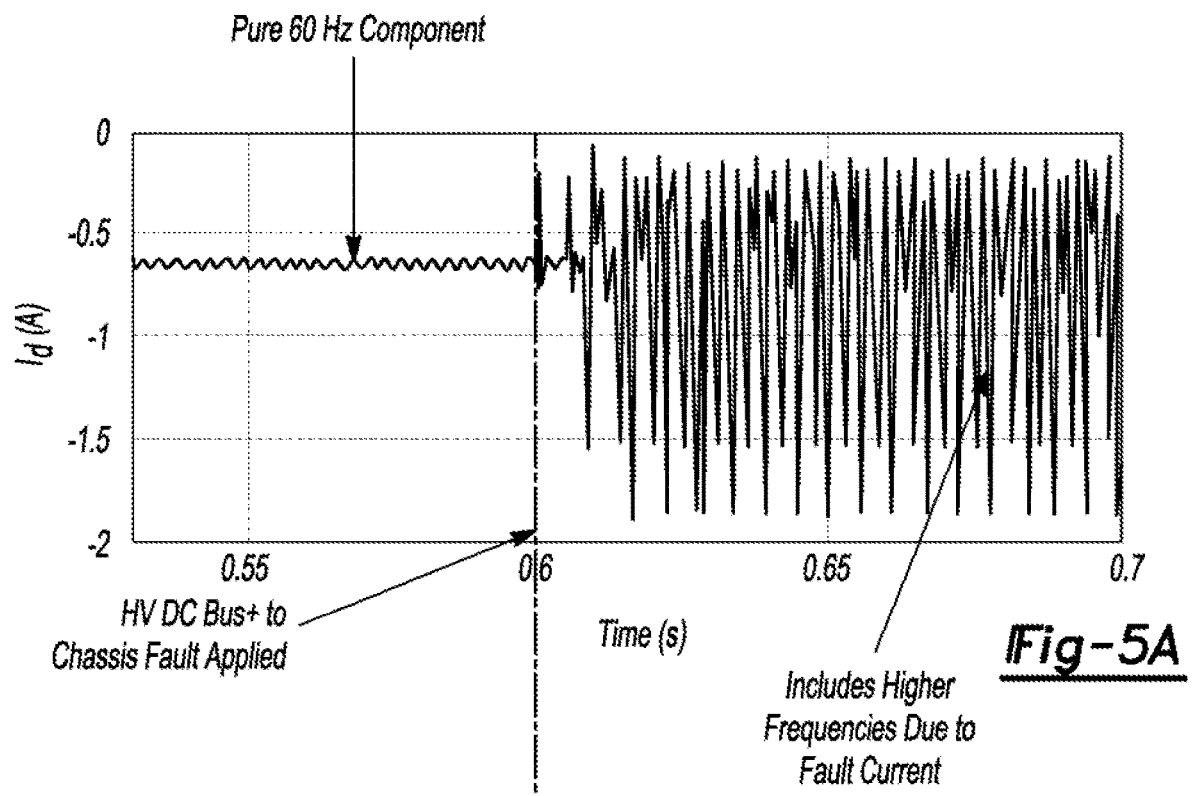
FIGS. 5A and 5B are plots of Id and Iq transformed dq-phase current magnitude vs. time, respectively.
Figure 5B:
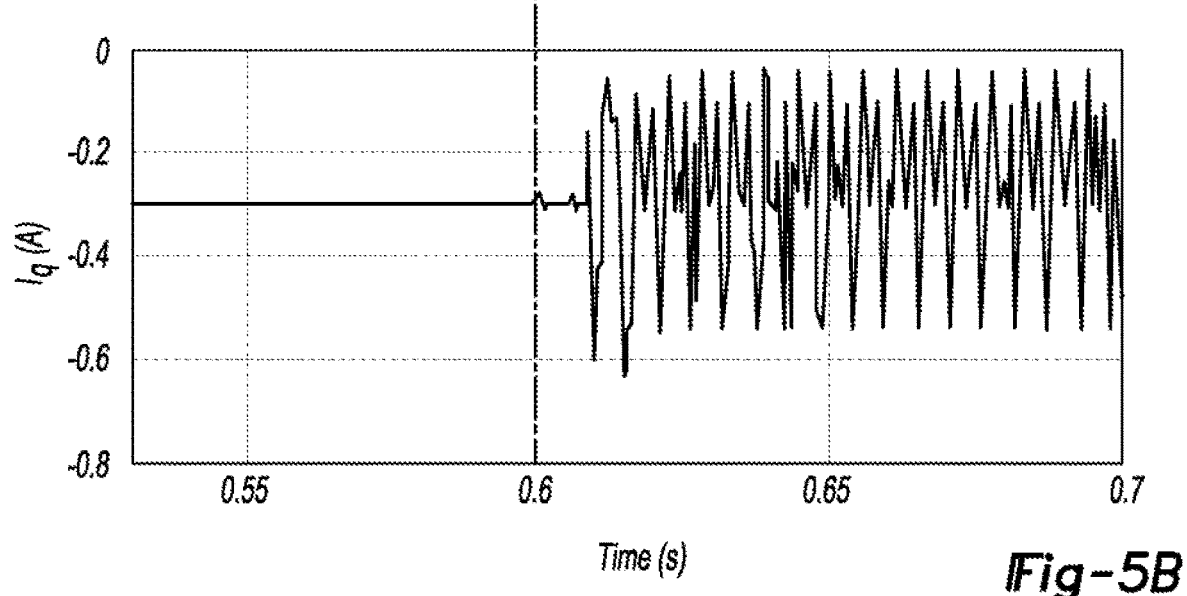

The filtered input phase current is converted to two DC components using the dq-transformation: The (PLL) is used to measure the AC line voltage frequency. The measured phase current is converted to a rotating complex space vector. The reference frame is rotated with speed equivalent to the frequency of the ac line voltage. FIGS. 5A and 5B show the transformed dq-phase current. (Reference the operations 44, 46, 48, and 56)

Figures 6A, 6B:
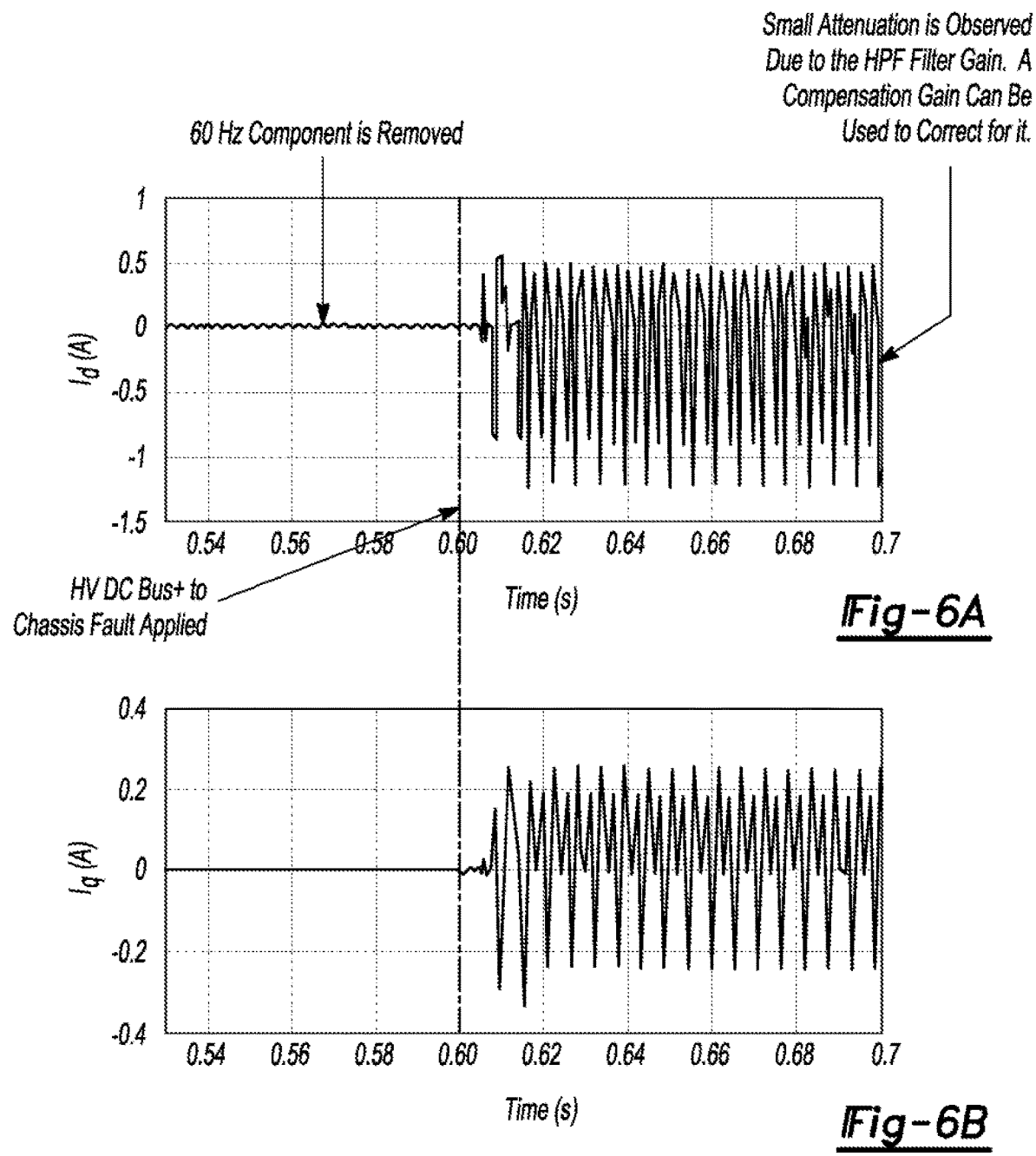
FIGS. 6A and 6B are plots of the Id and Iq transformed dq-phase current magnitude vs. time of FIGS. 5A and 5B after low pass filtering, respectively.
Figure 7A:
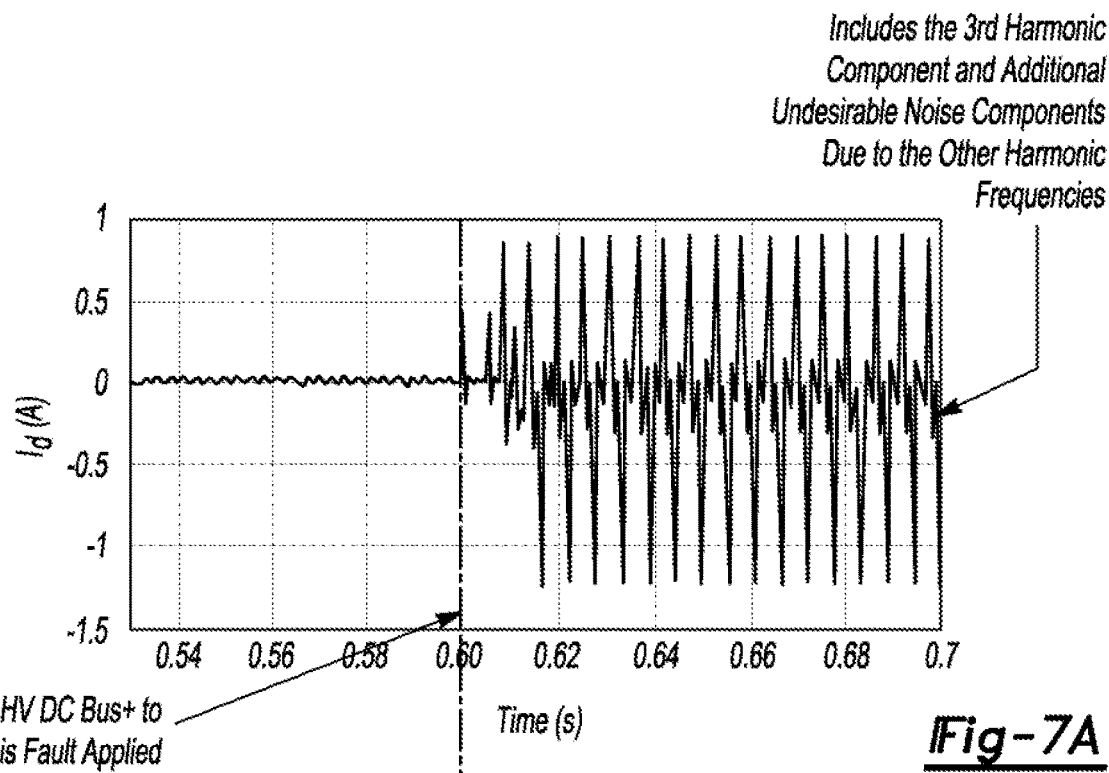
FIGS. 7A and 7B are plots of the Id and Iq transformed dq-phase current magnitude vs. time of FIGS. 6A and 6B with respect to the third harmonic, respectively.
Figure 7B:
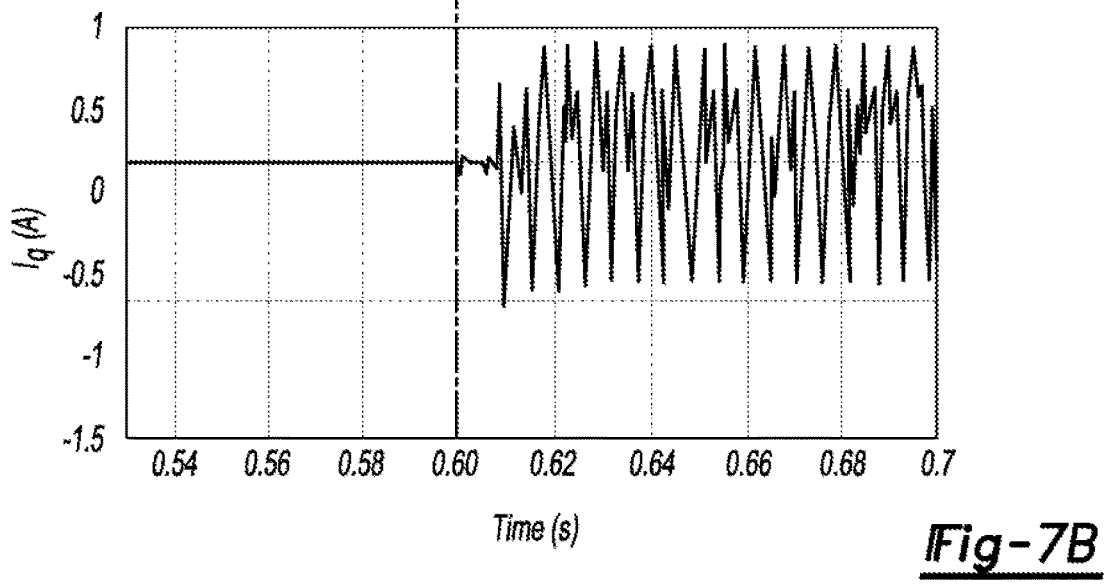

A high pass filter is used to remove the 60 Hz component. The third harmonic component for the phase current is measured by applying a dq-transformation to the filtered phase current. The reference frame is synchronized to the third harmonic component. FIGS. 6A and 6B show the transformed dq-phase current after applying the low pass filter. The filter's cutoff frequency is designed such that a settling time of less than, for example, 40 ms from the fault instant is achieved. FIGS. 7A and 7B show the dq-transformed phase current with respect to the third harmonic.

Figure 8A:
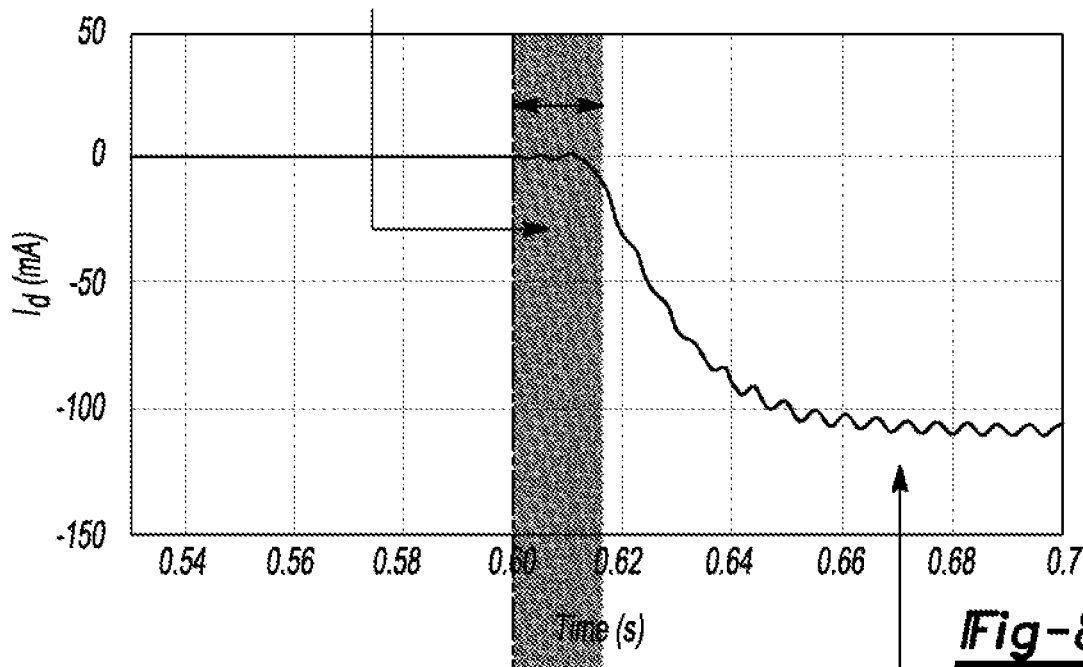
FIGS. 8A and 8B are plots the Id and Iq third harmonic components vs time.
Figure 8B:
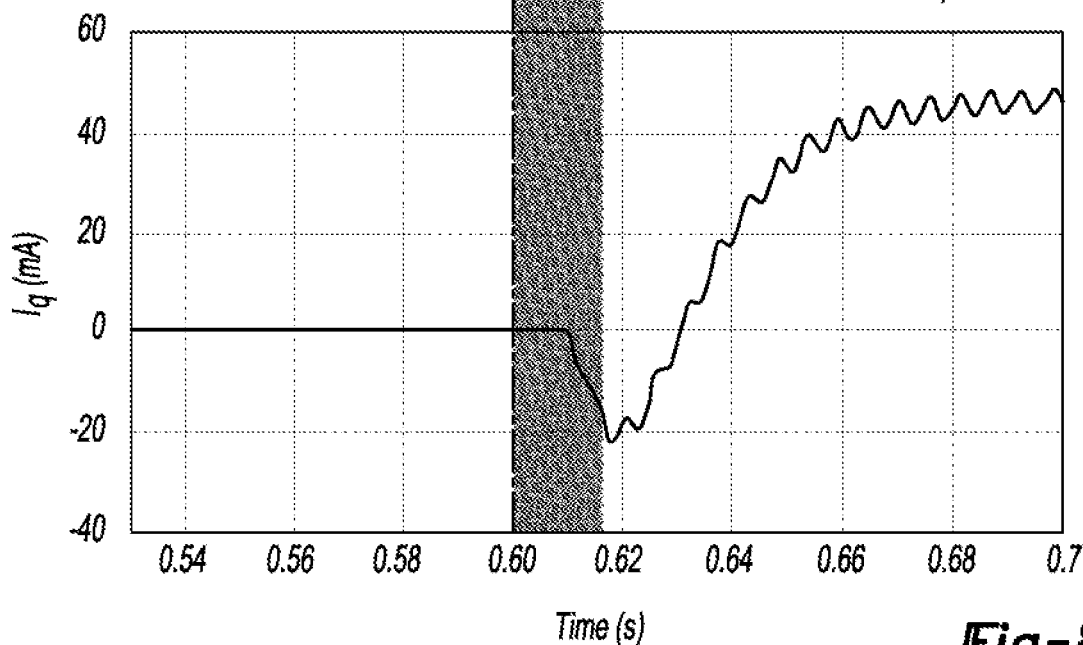

FIGS. 8A and 8B show calculation of the third harmonic component. (Reference the operations 50, 52, 54, 58, and 60).

Figure 9:
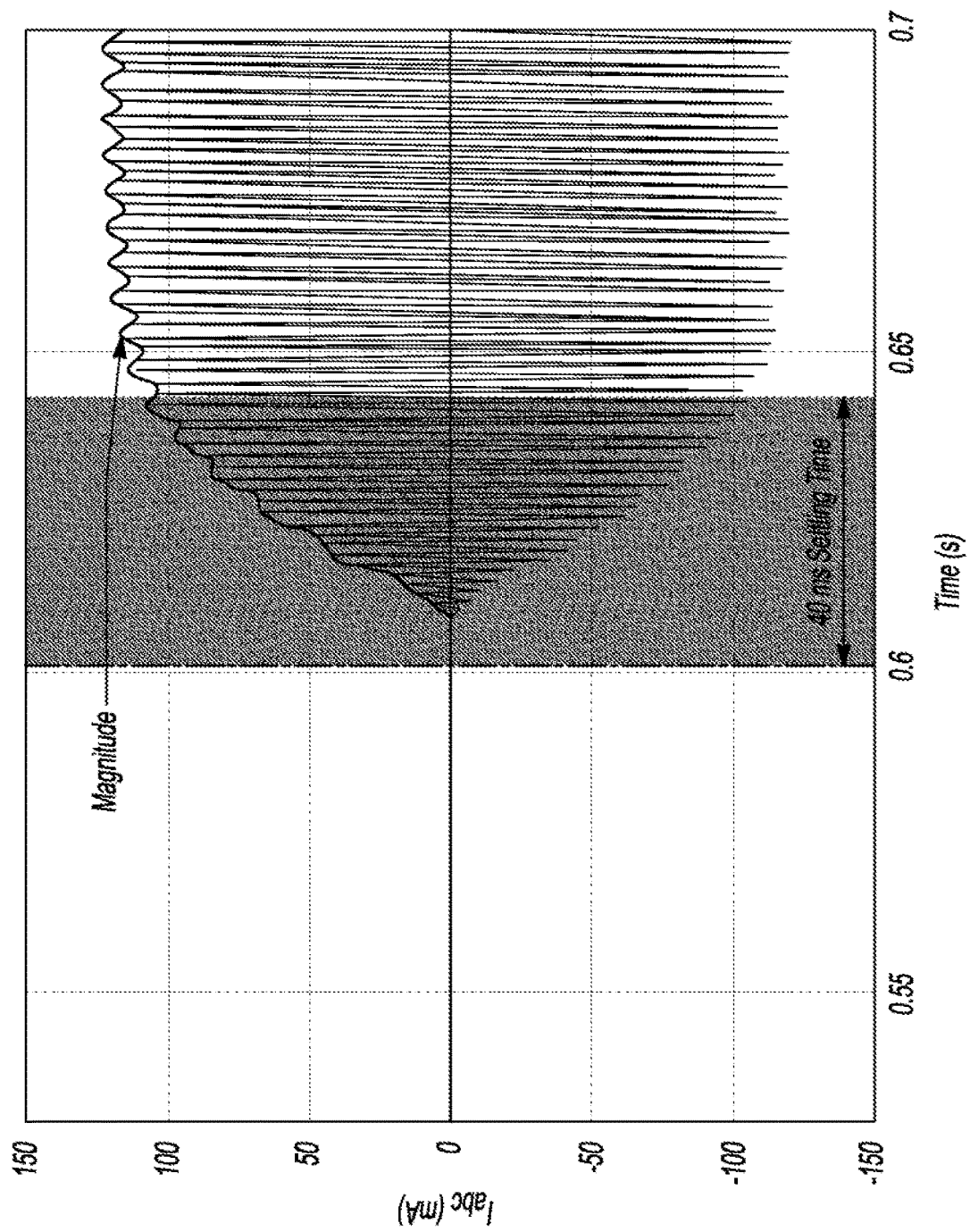
FIG. 9 is a plot of Iab magnitude vs. time.

Detection of ground fault current is achieved by sensing that a magnitude of the third harmonic component of the input phase current has exceeded a threshold value, e.g., 100 mA. Other threshold values are contemplated and may be determined via simulation, testing, etc. FIG. 9 shows the magnitude of the ground fault current. Detection in this example is achieved within 40 ms. (Reference the operations 62 and 64.)

Responsive to the detection, the controllers 32 may interrupt a connection between the ac grid 26 and battery 30. The controllers 32, for example, may open contactors (not shown) electrically connecting the ac grid 26 and battery 30, deactivate the power converter 28, etc.

The algorithms, processes, methods, logic, or strategies disclosed may be deliverable to and/or implemented by a processing device, controller, or computer, which may include any existing programmable electronic control unit or dedicated electronic control unit. Similarly, the algorithms, processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The algorithms, processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle power system comprising:
    a traction battery;
    a non-isolated power converter configured to transfer grid power to the traction battery;
    a current sensor configured to measure phase current input to the non-isolated power converter during charging of the traction battery with grid power; and
    a controller configured to
        interrupt an electrical connection between the traction battery and a source of the grid power responsive to a magnitude of a 3rd harmonic component of the phase current exceeding a threshold value to prevent further charging of the traction battery,
        filter the phase current to attenuate a fundamental frequency component of the phase current, and
        implement a phase lock loop to identify the fundamental frequency component of the phase current.

2. The vehicle power system of claim 1, wherein the controller is further configured to transform the phase current into two DC components having a reference frame synchronized with the fundamental frequency component.

3. The vehicle power system of claim 2, wherein the controller is further configured to filter the phase current to further attenuate the fundamental frequency component.

4. The vehicle power system of claim 3, wherein the controller is further configured to synchronize the reference frame with the 3rd harmonic component.

5. The vehicle power system of claim 4, wherein the controller is further configured to filter the two DC components to attenuate harmonic frequency components of the phase current greater than the 3rd harmonic component.

6. The vehicle power system of claim 5, wherein a magnitude of the two DC components defines the magnitude of the 3rd harmonic component.

7. A method for controlling a vehicle power system, comprising:
    responsive to detecting, during charging of a traction battery of the vehicle power system with grid power, that a magnitude of a 3rd harmonic component of phase current input to a non-isolated power converter exceeds a threshold value, interrupting by a controller an electrical connection between the traction battery and a source of the grid power to prevent further charging of the traction battery;
    filtering the phase current to attenuate a fundamental frequency component of the phase current;
    identifying the fundamental frequency component of the phase current; and
    transforming the phase current into two DC components having a reference frame synchronized with the fundamental frequency component.

8. The method of claim 7 further comprising filtering the phase current to further attenuate the fundamental frequency component.

9. The method of claim 8 further comprising synchronizing the reference frame with the 3rd harmonic component.

10. The method of claim 9 further comprising filtering the two DC components to attenuate harmonic frequency components of the phase current greater than the 3rd harmonic component.

11. The method of claim 10, wherein a magnitude of the two DC components defines the magnitude of the 3rd harmonic component.

* * * * *